April 29, 1952     S. BRUMBERGER     2,594,390
DEVICE FOR VIEWING SLIDES
Filed Dec. 26, 1950
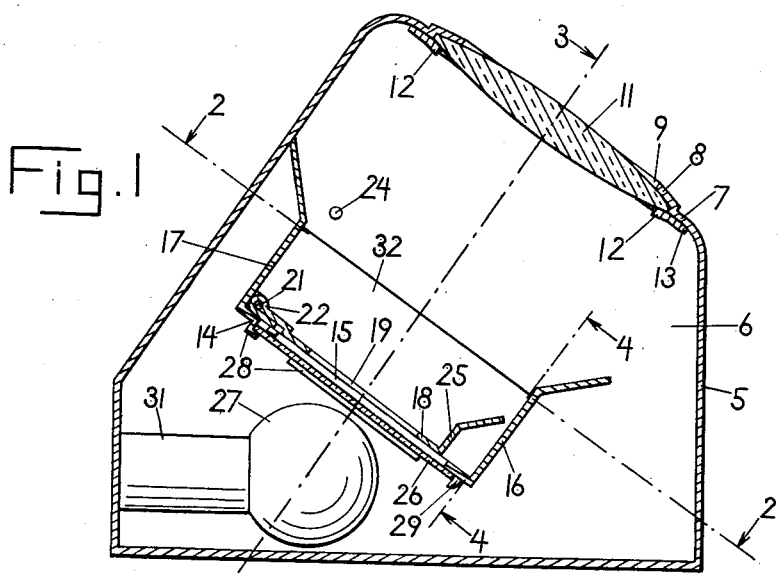
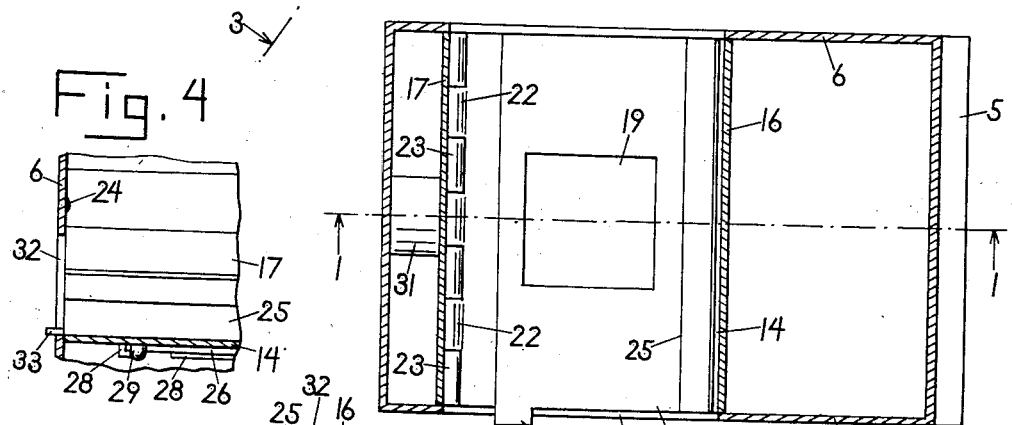
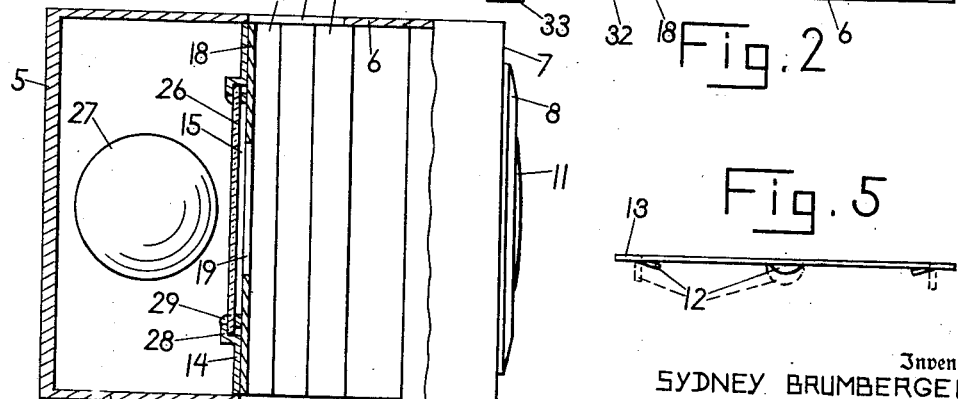
Inventor:
SYDNEY BRUMBERGER
By Maurice Block
Attorney

UNITED STATES PATENT OFFICE 2,594,390

DEVICE FOR VIEWING SLIDES

Sydney Brumberger, Lawrence, N. Y.

Application December 26, 1950, Serial No. 202,767

3 Claims. (Cl. 88—1)

My invention relates to apparatus for viewing pictures or slides which are exchangeably inserted in the apparatus.

Objects of my invention are to secure a light-diffusing sheet, a slide-support and a lens for observation of the slide in proper mutual positions by simple and reliable means, and to provide the apparatus with a structure that can be easily, accurately, inexpensively and quickly made and assembled, and that will not be weakened by heat from a light source positioned in the apparatus.

Other objects are to adapt the apparatus to slides of various sizes, to perform this adaptation easily and quickly and by means incorporated in and permanently connected to the apparatus, thereby to make unnecessary the insertion of the slides in frames of which each fits a particular size of slide, and to avoid the inconveniences and expenses which result from the use of such frames and from the possibility of mislaying the same.

Still other objects and advantages will appear from the following description of an exemplifying embodiment of my invention, from the appended claims and from the accompanying drawing in which:

Fig. 1 shows a cross-section of an illustrative embodiment of my invention, taken along the line 1—1 in Fig. 2, an electric bulb and its socket being represented non-sectionally.

Fig. 2 shows a cross-section taken along the line 2—2 in Fig. 1.

Fig. 3 shows a partially sectional view of the same embodiment, the sectionally represented parts being cut along the line 3—3 in Fig. 1.

Fig. 4 shows a cross-section of a broken off part of the same embodiment, this cross-section being taken along the line 4—4 in Fig. 1.

Fig. 5 shows a side view of a lens-holding plate which is an element of the embodiment shown in Fig. 1.

Referring to the drawing, numeral 5 indicates a housing which may be made of sheet metal walls united in any suitable manner after the inner parts of the embodiment have been affixed to the walls. These walls comprise two parallel vertical walls 6 positioned laterally with respect to the viewer and a wall 7 facing the eyes of the viewer and being preferably positioned on top of the housing in an obliquely declining direction.

The wall 7 has an outwardly projecting portion 8 pressed out of this wall in such a manner that this portion forms a circular shallow recess of the inner space of the housing. The wall portion 8 has an opening 9. A magnifying glass or lens 11 is inserted in this recess and extends across the opening 9. A number of lobes or flat projections 12 extend from the inner side of the wall 7 at the circumference of its recess and are bent over the rim of the lens 11 whereby the latter is affixed to the housing without impairing the outer appearance. The lobes 12 may be affixed to the wall 7 in any suitable manner. For example, these lobes may be stamped out, integral parts of a ring 13 of sheet metal which is welded or soldered to the wall 7. The lobes 12, when stamped, may be positioned about vertically to the ring 13 as shown in Fig. 5 in dotted lines. After insertion of the lens into the recess of the wall 7, the lobes are bent as shown in full lines in Figs. 1 and 5.

A plate 14 extends across the housing from one wall 6 to the other and is inclined parallel to the wall 7 or its opening 9. A rim or strip 16 forms an angularly and upwardly bent continuation of the plate 14. The opposite rim 17 of this plate may be similarly bent. The plate 14 serves to support a slide at a suitable distance from the lens 11. The rim contributes to this support and serves as a guide for positioning the slide. The plate 14 has a centrally located aperture 15 which has such a distance from the rim 16 that the pictorial transparent area of the slide overlies this aperture when the lower edge of the slide contacts the rim 16. The plate 14 is affixed to the housing 5 in any suitable manner.

Slides of various sizes can be placed on the plate 14 if each of these sizes is sufficiently large to reach from the rim 16 over the entire aperture 15. In order to place smaller slides in positions centred with respect to the line of vision and without side light from the aperture 15 disturbing the observation, a second plate 18 is provided which has a smaller aperture 19. The plate 18 is hinged to the plate 14 by a shaft 21 extending laterally from the apertures 15 and 19 and perpendicularly to the walls 6. This shaft passes through eyelets 22 formed by a rim of the plate 18 and through similar eyelets 23 forming extensions of the plate 14 whereby the plate 18 is turnable about the shaft 21 to and fro between a position parallel to and overlying the plate 14 and a position adjacent to the rim 17 and substantially perpendicular to the plate 14. Reaching the latter position, the plate 18 snaps over a small inner projection 24 of one of the walls 6 or of similar projections of both walls 6. The projection 24 is formed by impressing the wall 6 from the outside and engages the plate 18 releasably whereby this plate is prevented from falling back unintentionally.

When the plates 14 and 18 are in parallel positions, their apertures 15 and 19 are concentric. The plate 18 is provided with an angularly bent rim 25 similar to, but smaller than the rim 16. The distance of the rim 25 from the center of the apertures is smaller than the corresponding distance of the rim 16 whereby the rim 25 forms a suitable guide and support for smaller slides having pictorial areas positioned over the aperture 19.

A light-diffusing sheet 26 is positioned under and across the aperture 15 and is attached to the plate 14 in such a manner that no separate parts are required, that the sheet 26 can be easily brought into the proper position, and that solder or other connecting means are avoided which may weaken under the heat of a light source or electric bulb 27 positioned closely under the sheet 26. For this purpose, ledges or strips 28 are stamped out of the plate 14 and are bent so that their cross-sections form right angles. The sheet 26 has a rectangular shape larger than the aperture 15, whereby the edges of the sheet extend beyond this aperture in contact with the plate 14. The strips 28 extend along two parallel edges or along three edges of the sheet and reach around the respective sheet edges, forming together with the plate 14 channels for engagement of these edges. Also stamped out of the plate 14 are one or more projections 29 which abut the fourth edge of the sheet.

The sheet 26 is preferably made of resilient material, for example, of plastics and can be brought into the described position by shifting the sheet slidingly over the projections 29 into the channels formed by the strips 28. First the sheet slides in the two parallel channels, then it enters the third channel and snaps over the projections 29 whereby the sheet is secured in the space between the strips 28 and the plate 14.

The bulb 27 is positioned at that side of the sheet 26 which is opposite to the lens 11 and may be affixed to the housing 5 in any suitable manner, for example, by a socket 31. The bulb may be supplied with current and may be provided with a switch in well known manner.

Each or one of the walls 6 is provided with a window 32 for the insertion of slides. This window may form a rectangle of which three sides are flush with the facing surfaces of the rims 16 and 17 and with the upper surface of the plate 14. An extension 33 of the plate 18 projects through a window 32 and forms a handle for changing the position of this plate.

The magnifying lens 11 is so designed that the picture viewed through the lens appears in undistorted flatness whether this picture has about the same diagonal width as the lens or has a considerably smaller width. I have found that the lens types hitherto used in picture-viewing apparatus cannot attain this result, and I have solved this problem by using a bi-convex lens 11 of equal diopters at both sides, these diopters being measured to correspond to a focal length which is equal to twice the diagonal width of the largest picture to be viewed or to the diagonal width of the aperture 15. This lens cooperates with the movably connected slide-supporting plates 14 and 18 in adapting the described apparatus for viewing transparencies or pictures of considerably different sizes.

I desire it understood that my invention is not confined to the particular embodiment shown and described, the same being merely illustrative, and that my invention may be carried out in other ways within the scope of the appended claims without departing from the spirit of my invention, as it is obvious that the particular embodiment shown and described is only one of the many that may be employed to attain the objects of my invention.

Having described the nature of my invention, what I claim and desire to protect by Letters Patent is:

1. An apparatus for viewing pictures, comprising a housing having an opening, a lens affixed to said housing and extending across said opening, a slide-supporting plate affixed to and extending in said housing parallel to said opening, having an angularly bent rim for guiding a slide and having an aperture, a light diffusing sheet attached to said plate and extending across said aperture, a second slide-supporting plate having an aperture smaller than said first mentioned aperture, being hinged to said first mentioned plate along an axis lateral from said apertures and being swingable from a position parallel to said first plate into a position substantially perpendicular thereto, said two apertures being concentric when said swingable plate is in said parallel position, said swingable plate having an angularly bent rim for guiding a slide which is parallel to said first mentioned rim and has a smaller distance from the center of said apertures than the first mentioned rim, and a light source positioned at that side of said sheet which is opposite to said lens.

2. An apparatus for viewing pictures, comprising a housing having an opening, a lens affixed to said housing and extending across said opening, a slide-supporting plate affixed to and extending in said housing parallel to said opening and having an aperture, a light-diffusing sheet attached to said plate and extending across said aperture, a second slide-supporting plate having an aperture smaller than said first mentioned aperture, being hinged to said first mentioned plate along an axis lateral from said apertures and being swingable from a position parallel to said first plate into a position substantially perpendicular thereto, and a light source positioned at that side of said sheet which is opposite to said lens, said housing having a side wall perpendicular to said axis, said wall having an impression forming an inner projection engaging said swingable plate in said perpendicular position of the same.

3. An apparatus for viewing pictures, comprising a housing having an opening, a lens affixed to said housing and extending across said opening, a slide-supporting plate affixed to and extending in said housing parallel to said opening and having an aperture, a light-diffusing sheet attached to said plate and extending across said aperture, a second slide-supporting plate having an aperture smaller than said first mentioned aperture, being hinged to said first mentioned plate along an axis lateral from said apertures and being swingable from a position parallel to said first plate into a position substantially perpendicular thereto, and a light source positioned at that side of said sheet which is opposite to said lens, said housing having a side wall perpendicular to said axis, said wall having a window for the insertion of a slide, said swingable plate having a handle projecting through said window.

SYDNEY BRUMBERGER.

REFERENCES CITED

The following references are of record in the file of this patent:

UNITED STATES PATENTS

| Number | Name | Date |
| --- | --- | --- |
| 1,450,555 | Lepine | Apr. 3, 1923 |
| 1,487,173 | Manion | Mar. 18, 1924 |
| 1,503,302 | Cocanari | July 29, 1929 |
| 2,010,551 | McConalogue | Aug. 6, 1935 |
| 2,059,197 | Backer et al. | Nov. 3, 1936 |
| 2,129,759 | Goldman | Sept. 13, 1938 |
| 2,445,929 | Sturgess | July 27, 1948 |
| 2,446,052 | Loessel et al. | July 27, 1948 |